United States Patent
Shimizu et al.

(10) Patent No.: US 8,522,923 B2
(45) Date of Patent: Sep. 3, 2013

(54) FLUID SUPPLY APPARATUS

(75) Inventors: Osamu Shimizu, Okazaki (JP); Motoki Sasaki, Isehara (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 1210 days.

(21) Appl. No.: 12/441,039

(22) PCT Filed: Dec. 12, 2007

(86) PCT No.: PCT/JP2007/074357
§ 371 (c)(1),
(2), (4) Date: Mar. 12, 2009

(87) PCT Pub. No.: WO2008/072775
PCT Pub. Date: Jun. 19, 2008

(65) Prior Publication Data
US 2010/0062890 A1 Mar. 11, 2010

(30) Foreign Application Priority Data
Dec. 12, 2006 (JP) ................. 2006-334749

(51) Int. Cl.
*F16H 57/04* (2010.01)
*F01P 7/14* (2006.01)
*G05D 7/06* (2006.01)

(52) U.S. Cl.
USPC ........................................ 184/6.12

(58) Field of Classification Search
USPC ............ 184/6.9, 6.12, 7.3, 6.22; 137/625.48, 137/625.49, 625.5; 236/93 R, 79, 34.5
See application file for complete search history.

(56) References Cited

U.S. PATENT DOCUMENTS

| 4,027,643 | A | * | 6/1977 | Feenan et al. ............ 123/196 AB |
| 4,655,249 | A | * | 4/1987 | Livet ............................ 137/625.5 |
| 5,138,837 | A | * | 8/1992 | Obertrifter et al. .............. 60/426 |
| 6,012,550 | A | * | 1/2000 | Lee ................................. 184/6.22 |
| 7,325,747 | B2 | * | 2/2008 | Jonte ........................... 236/12.15 |
| 2003/0136855 | A1 | * | 7/2003 | Brown ........................ 236/101 R |
| 2004/0204280 | A1 | | 10/2004 | Miyata et al. |
| 2006/0108435 | A1 | * | 5/2006 | Kozdras et al. ............. 236/93 R |
| 2008/0029246 | A1 | * | 2/2008 | Fratantonio et al. .......... 165/103 |

FOREIGN PATENT DOCUMENTS

| CN | 1536249 A | 10/2004 |
| DE | 102 50 971 A1 | 5/2004 |
| DE | 103 08 502 A1 | 9/2004 |
| JP | 60-148617 U | 10/1985 |
| JP | 63-145066 U | 9/1988 |
| JP | 03-110285 U | 11/1991 |

(Continued)

OTHER PUBLICATIONS

Chinese Office Action issued in corresponding Chinese Patent Application No. 200780038853.2, dated Apr. 20, 2011.

*Primary Examiner* — William E Dondero
*Assistant Examiner* — Mark K Buse
(74) *Attorney, Agent, or Firm* — Sughrue Mion, PLLC

(57) ABSTRACT

A fluid supply apparatus includes a main passage through which fluid flows, a parallel passage section, and a pressure loss adjusting mechanism. The parallel passage section includes a plurality of passages connected in parallel to the main passage. The parallel passage section includes a selector valve, which changes the number of passages through which fluid passes among the plurality of passages. The pressure loss adjusting mechanism suppresses change in the pressure loss at the parallel passage section associated with change in an operating state of the selector valve.

2 Claims, 13 Drawing Sheets

(56) References Cited

FOREIGN PATENT DOCUMENTS

| JP | 3-119687 U | 12/1991 |
| JP | 2002-149244 A | 5/2002 |
| JP | 2005-048935 A | 2/2005 |

* cited by examiner

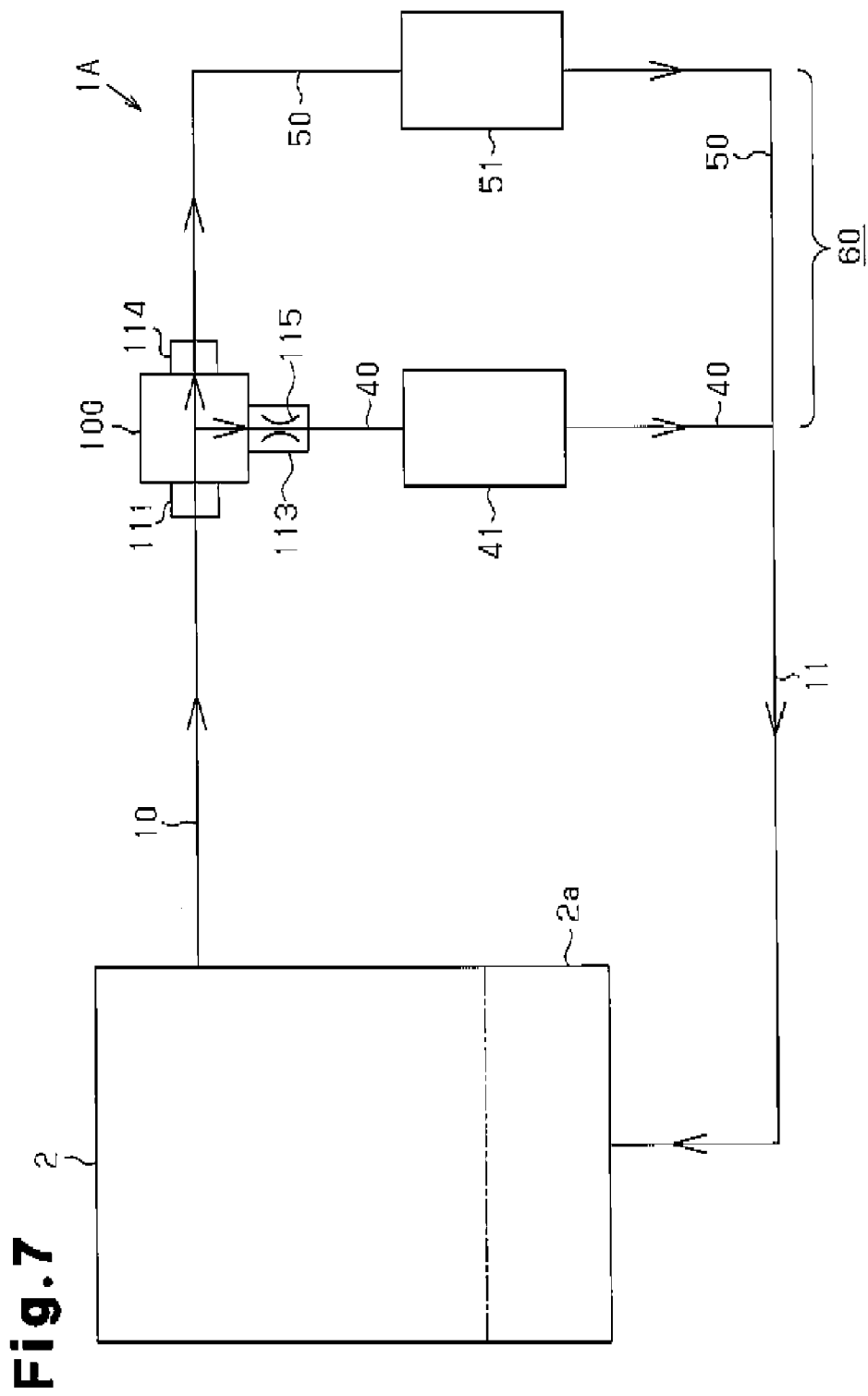

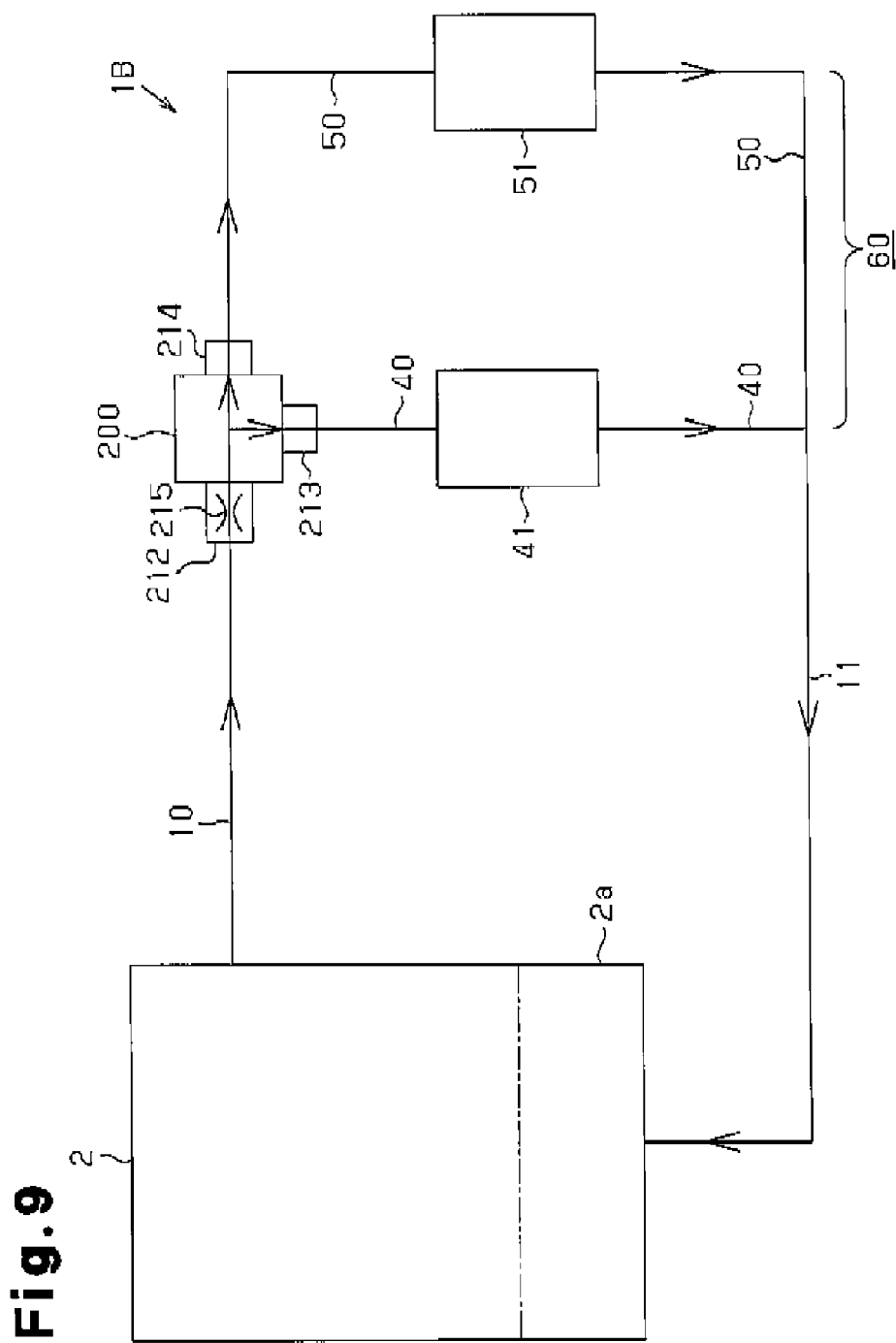

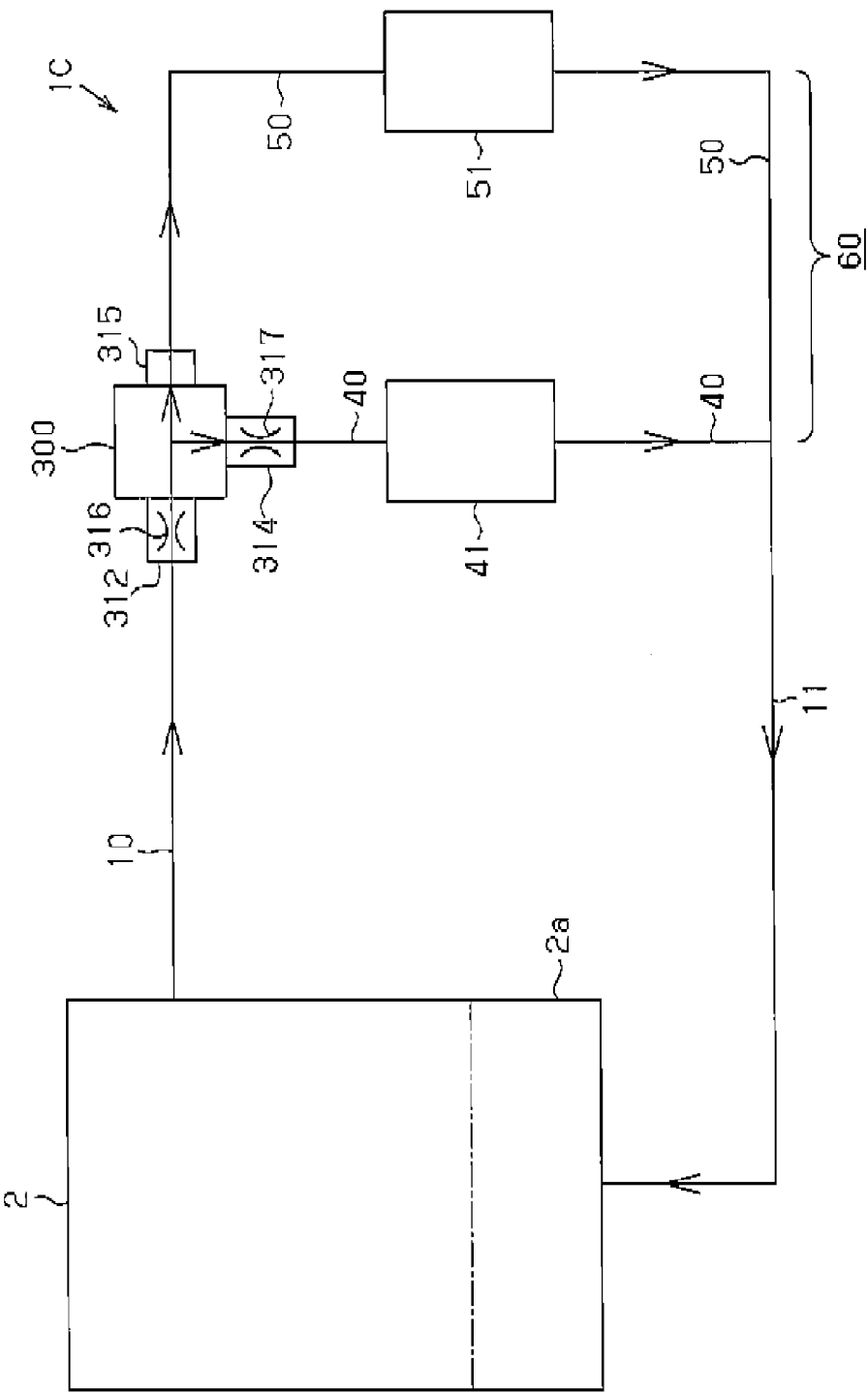

FLUID SUPPLY APPARATUS

TECHNICAL FIELD

The present invention relates to a fluid supply apparatus that includes passages connected in parallel.

BACKGROUND ART

Japanese Laid-Open Patent Publication No. 2002-149244 discloses a fluid supply apparatus which includes a parallel passage section where passages are connected in parallel. In the above fluid supply apparatus, a working fluid in an automatic transmission is supplied to a radiator and a thermal storage tank to perform heat exchange, and the working fluid that has been subjected to heat exchange is returned to the automatic transmission. Also, in the fluid supply apparatus, a conduit connected to the radiator and a conduit connected to the thermal storage tank are connected in parallel with each other. A selector valve is operated to shift between a state in which the working fluid is supplied to only the radiator and a state in which the working fluid is supplied to both of the radiator and the thermal storage tank.

In the above mentioned fluid supply apparatus, when the number of passages through which fluid passes in the parallel passage section is changed in accordance with the operating state of the selector valve, the following drawbacks may occur.

That is, when the number of passages through which fluid passes in the parallel passage section is changed, the total cross-sectional area of the passages through which fluid flows is changed, thus changing the pressure loss at the parallel passage section. When the pressure loss at the parallel passage section is changed, the flow rate of fluid in the parallel passage section is also changed, which also changes the flow rate of fluid in the entire fluid supply apparatus.

DISCLOSURE OF THE INVENTION

Accordingly, it is an objective of the present invention to provide a fluid supply apparatus that suppresses change in the flow rate of fluid when the number of passages through which fluid flows at a parallel passage section is changed.

To achieve the foregoing and other objectives, the present invention, a fluid supply apparatus having a main passage through which fluid flows, a parallel passage section, and a pressure loss adjusting mechanism is provided. The parallel passage section includes a plurality of passages connected in parallel to the main passage. The parallel passage section includes a selector valve, which changes the number of passages through which fluid passes among the plurality of passages. The pressure loss adjusting mechanism suppresses change in the pressure loss at the parallel passage section associated with change in an operating state of the selector valve.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 7 is a schematic diagram illustrating the flow path of ATF when the operating state of the selector valve according to the first embodiment is in the second state;

FIG. 9 is a schematic diagram illustrating the flow path of ATF when the operating state of the selector valve according to the second embodiment is in the second state;

FIG. 11 is a schematic diagram illustrating the flow path of ATF when the operating state of the selector valve according to the third embodiment is in the second state;

BEST MODE FOR CARRYING OUT THE INVENTION

A fluid supply apparatus 1A according to a first embodiment of the present invention will now be described with reference to FIGS. 1 to 7. In the first embodiment, the fluid supply apparatus 1A is installed in an automatic transmission mounted on a vehicle.

Figure 1:
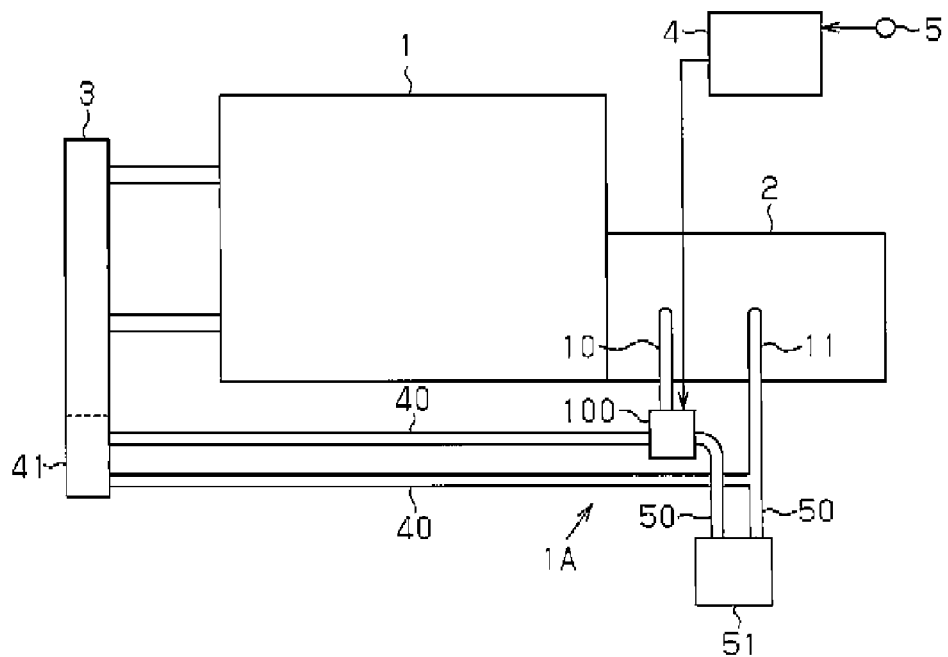
FIG. 1 is an overall view illustrating a fluid supply apparatus of an automatic transmission according to a first embodiment of the present invention and the peripheral structure of the fluid supply apparatus.

FIG. 1 shows an overall view of the fluid supply apparatus 1A according to the first embodiment and the peripheral structure of the fluid supply apparatus 1A.

As shown in FIG. 1, an internal combustion engine 1 is connected to a planetary gear automatic transmission 2, which includes a torque converter. In the first embodiment, fluid stored in the automatic transmission 2, or an automatic transmission fluid (ATF), is shared as a working fluid that transmits power in the torque converter, a working fluid for controlling operations of a brake and a clutch for selecting gear ranges of the automatic transmission 2, and lubricant for lubrication requiring parts that require lubrication such as shafts and bearings of the automatic transmission 2.

Figure 2:
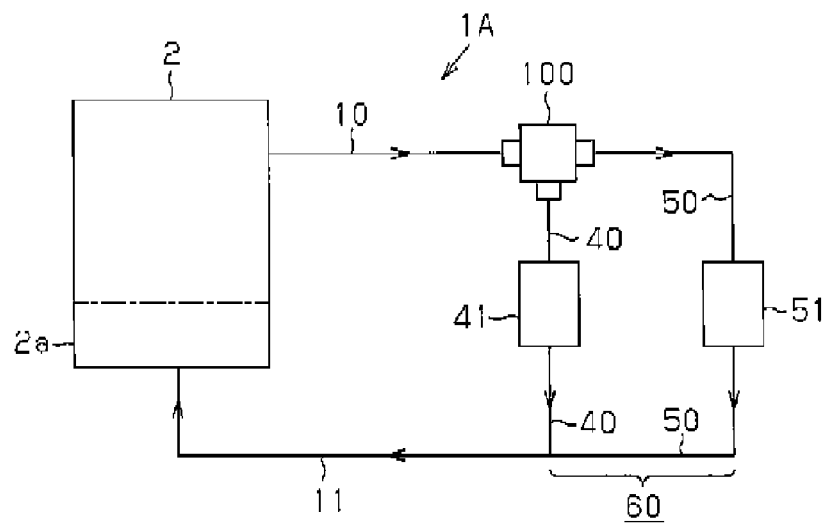
FIG. 2 is a schematic diagram illustrating a manner of connection of the fluid supply apparatus shown in FIG. 1.

The configuration of the fluid supply apparatus 1A according to the first embodiment will now be described with reference to FIGS. 1 and 2. FIG. 2 is a schematic diagram showing a manner of connection of the fluid supply apparatus 1A.

The fluid supply apparatus 1A has a main discharge passage 10 for discharging the ATF to the outside, a main return passage 11 for returning the discharged ATF to the automatic transmission 2, and a parallel passage section 60 which will be described below.

As shown in FIGS. 1 and 2, one end of the main discharge passage 10 is connected to the automatic transmission 2, and the other end of the main discharge passage 10 is connected to a selector valve 100.

The selector valve 100 is an electromagnetic valve, and the operating state of the selector valve 100 is controlled by a controller 4. More specifically, the temperature of the ATF detected by an oil temperature sensor 5 is sent to the controller 4. When the detected ATF temperature is less than a predetermined determination value α, the controller 4 de-energizes the selector valve 100 to bring the selector valve 100 into a first state described below. When the detected ATF temperature is greater than or equal to the determination value α, the controller 4 energizes the selector valve 100 to bring the selector valve 100 into a second state described below.

One end of a first passage 40 is connected to the selector valve 100, and the other end of the first passage 40 is connected to the main return passage 11. A first heat exchanger 41 is provided midway of the first passage 40. In the first embodiment, the first heat exchanger 41 is provided in a radiator 3, which cools coolant of the internal combustion engine 1. When the ATF temperature is higher than the coolant temperature, the first heat exchanger 41 reduces the ATF temperature, and when the ATF temperature is lower than the coolant temperature, the first heat exchanger 41 increases the ATF temperature.

Furthermore, one end of a second passage 50 is connected to the selector valve 100, and the other end of the second passage 50 is connected to the main return passage 11. A second heat exchanger 51 is provided midway of the second passage 50. In the first embodiment, the second heat exchanger 51 is provided in the vicinity of the automatic transmission 2. When the ATF passes through the second heat exchanger 51, the ATF is cooled.

The ATF that has been subjected to heat exchange with the first heat exchanger 41 and the second heat exchanger 51 is introduced to the main return passage 11 and is supplied to lubrication requiring parts 2a that require lubrication in the automatic transmission 2.

As shown in the drawings such as FIG. 2, the first passage 40 and the second passage 50 are connected in parallel to the main discharge passage 10 and the main return passage 11. The selector valve 100 changes the number of passages through which the ATF passes among the passages, which are the first passage 40 and the second passage 50. In the first embodiment, the first passage 40, the second passage 50, and the selector valve 100 configure the parallel passage section 60.

Figure 3A:
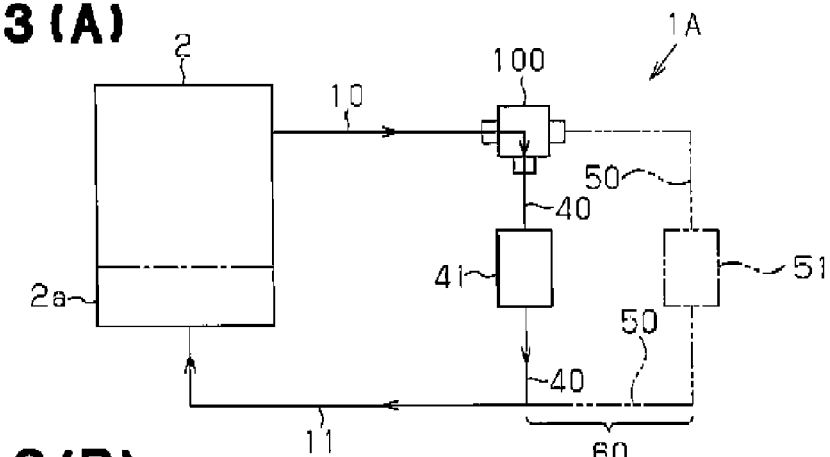
FIG. 3(A) is a schematic diagram illustrating the flow path of ATF when the operating state of the selector valve is in a first state.
Figure 3B:
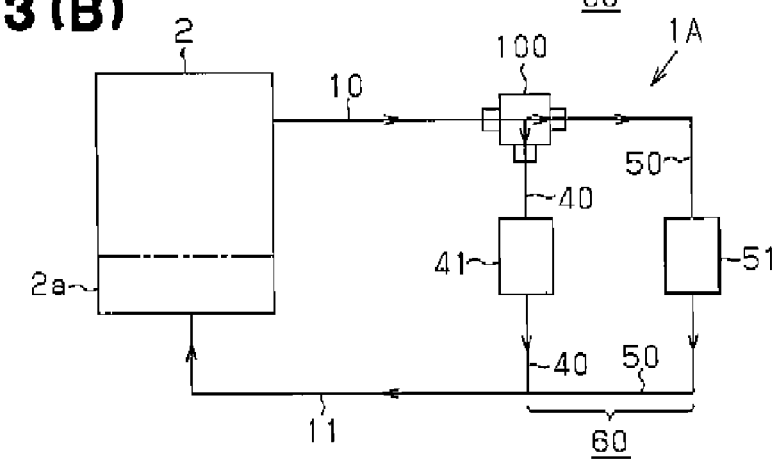
FIG. 3(B) is a schematic diagram illustrating the flow path of ATF when the operating state of the selector valve is in a second state.

FIGS. 3(A) and 3(B) each show the flow path of the ATF in the fluid supply apparatus. FIG. 3(A) shows the flow path when the operating state of the selector valve 100 is in the first state, FIG. 3(B) shows the flow path when the operating state of the selector valve 100 is in the second state.

When the ATF temperature is less than the determination value α, the selector valve 100 is brought into the first state as shown in FIG. 3(A). In the first state, the ATF passes through only the first passage 40 at the parallel passage section 60. In the first state, the ATF is subjected to heat exchange with the first heat exchanger 41.

As shown in FIG. 3(B), when the ATF temperature is greater than or equal to the determination value α, the selector valve 100 is brought into the second state. In the second state, the ATF passes through the first passage 40 and the second passage 50 at the parallel passage section 60. In the second state, the ATF is subjected to heat exchange with the first heat exchanger 41 and the second heat exchanger 51. As a result, the ATF temperature is adjusted to be less than the determination value α.

In this manner, the operating state of the selector valve 100 is changed in accordance with the ATF temperature, and according to the change in the operating state, the number of passages through which the ATF passes in the parallel passage section 60 is changed. Thus, the number of the heat exchangers through which the ATF passes in the parallel passage section 60 is also changed, thus permitting the heat exchanger effectiveness of the ATF to be variable. In this manner, since the heat exchanger effectiveness is varied in accordance with the ATF temperature, excessive heat increase and over cooling of the ATF are suppressed in an appropriate manner.

Figure 4:
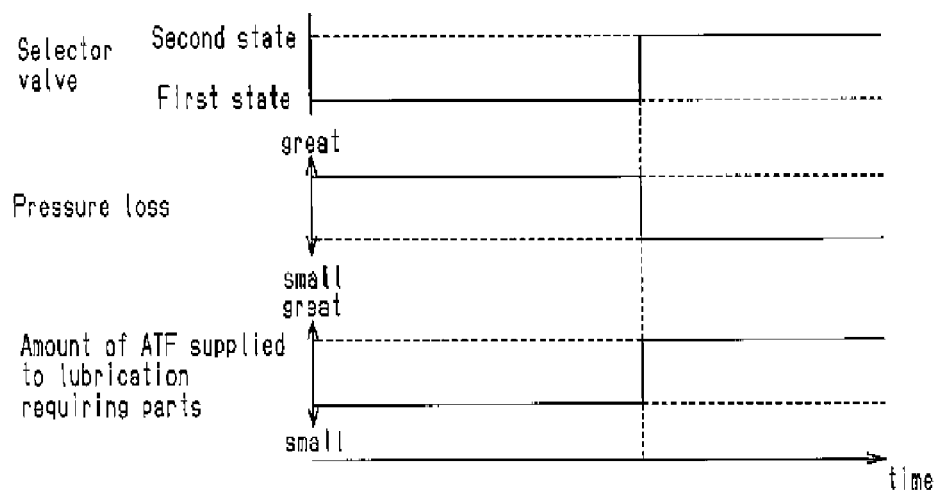
FIG. 4 is a time chart showing the change in the pressure loss at the parallel passage section when the operating state of the selector valve is changed from the first state to the second state, and the change in the amount of oil supplied to parts requiring lubrication.

As shown in FIG. 4, when the operating state of the selector valve 100 is changed from the first state to the second state, the number of passages through which the ATF passes in the parallel passage section 60 is increased, which increases the total cross-sectional area of the passages through which the ATF flows in the parallel passage section 60. Thus, the pressure loss in the parallel passage section 60 is reduced. When the pressure loss in the parallel passage section 60 is reduced, the flow rate of ATF that passes through the parallel passage section 60 is increased, which also increases the flow rate of ATF in the entire fluid supply apparatus. Thus, for example, the amount of ATF that is supplied from the main return passage 11 to the lubrication requiring parts 2a is increased. As a result, for example, the following drawbacks might occur.

As described above, the ATF is used not only for lubricating the lubrication requiring parts 2a, but also for transmitting power in the torque converter, and for controlling operations of the brake and the clutch for selecting the gear ranges of the automatic transmission 2. Thus, when the amount supplied to the lubrication requiring parts 2a is increased, the amount used for power transmission in the torque converter and the amount used for controlling the operations of the clutch and the brake are reduced. This may have no small effect on the power transmission of the torque converter and the operation control of the clutch and the brake.

Furthermore, when the amount of ATF that passes through the first heat exchanger 41 is increased, the amount of ATF that flows into the first heat exchanger 41 might exceed the heat exchange capacity of the first heat exchanger 41, and sufficient heat exchange might not be conducted.

The selector valve 100 of the first embodiment includes a pressure loss adjusting mechanism, which suppresses change in the pressure loss at the parallel passage section 60 that is associated with the change in the operating state of the selector valve 100.

Figure 5:
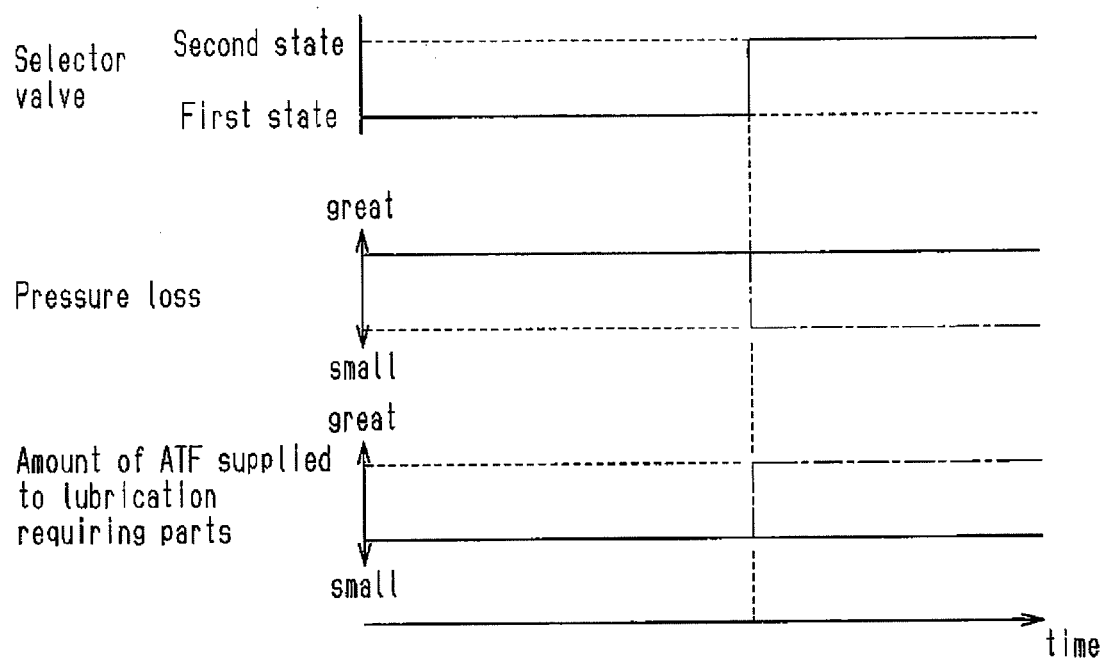
FIG. 5 is a time chart showing the operation of a pressure loss adjusting mechanism according to the first embodiment.

As shown in FIG. 5, the pressure loss adjusting mechanism suppresses decrease in the pressure loss at the parallel passage section 60 (shown by a dashed line in FIG. 5) caused by increasing the number of passages through which the ATF passes in the parallel passage section 60 by operating the selector valve 100. More specifically, when the selector valve 100 is changed from the first state to the second state so that the number of passages through which the ATF passes in the parallel passage section 60 is increased, the pressure loss adjusting mechanism equalizes the levels of the pressure loss at the parallel passage section 60 before and after increasing the number of passages through which the ATF passes. In this manner, the flow rate of ATF in the entire fluid supply apparatus is suppressed from being changed after increasing the number of passages through which the ATF passes.

Figure 6A:
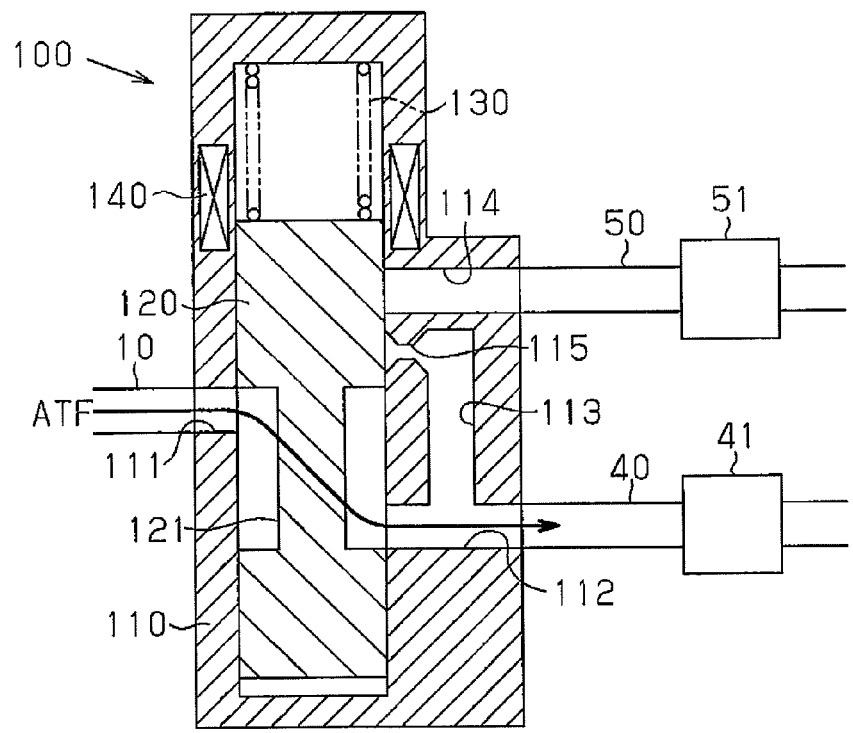
FIG. 6(A) is a cross-sectional view illustrating the selector valve according to the first embodiment in the first state.
Figure 6B:
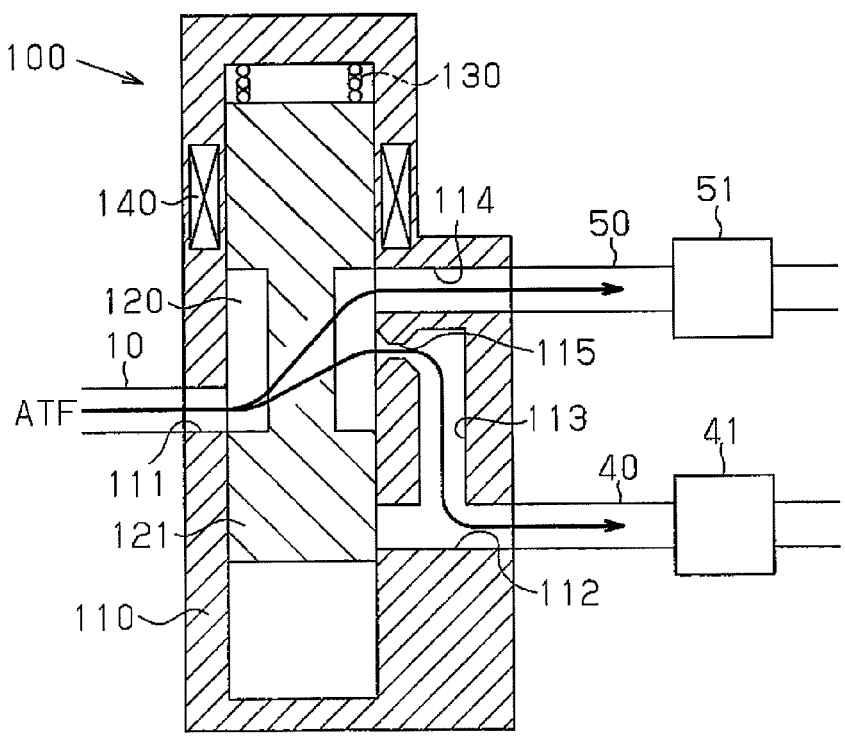
FIG. 6(B) is a cross-sectional view illustrating the selector valve according to the first embodiment in the second state.

FIGS. 6(A) and 6(B) show the cross-sectional structure of the selector valve 100 equipped with the pressure loss adjusting mechanism. FIG. 6(A) shows the cross-sectional structure of the selector valve 100 in the first state, and FIG. 6(B) shows the cross-sectional structure of the selector valve 100 in the second state.

As shown in FIGS. 6(A) and 6(B), the selector valve 100 includes a hollow sleeve 110, a rod-like valve body 120, a spring 130, and an electromagnetic coil 140. The valve body 120 moves in the sleeve 110 along the axial direction of the sleeve 110 to switch the operating state of the selector valve 100. The spring 130 urges the valve body 120 toward a first end in the sleeve 110. The electromagnetic coil 140 moves the valve body 120 in the sleeve 110 in a direction opposite to the direction in which the spring 130 urges the valve body 120.

The sleeve 110 is provided with an inlet passage 111, which connects the main discharge passage 10 to the interior of the sleeve 110, a first outlet passage 112 and a second outlet passage 113, which connect the first passage 40 to the interior of the sleeve 110, and a third outlet passage 114, which connects the second passage 50 to the interior of the sleeve 110.

The second outlet passage 113 is provided with a constriction 115. The constriction 115 configures the pressure loss adjusting mechanism. The constriction 115 increases the pressure loss of the second outlet passage 113 to compensate for the decrease in the pressure loss at the parallel passage section 60 caused by increasing the number of passages through which the ATF passes in the parallel passage section 60. The diameter of a bore forming the constriction 115 is of a size appropriate for compensating for the decrease in the pressure loss. In other words, the diameter of the bore forming the constriction 115 is set to a size that can equalize the levels of the pressure loss at the parallel passage section 60 before and after increasing the number of passages through which the ATF passes.

Furthermore, the valve body 120 includes a small diameter portion 121 for switching the connection state of the passages 111 to 114. As shown in FIG. 6(A), the small diameter portion 121 is formed such that the inlet passage 111 is connected to the first outlet passage 112 when the selector valve 100 is in the first state, that is, when the valve body 120 is moved to the first end in the sleeve 110 by the force of the spring 130.

As shown in FIG. 6(B), the small diameter portion 121 is formed such that the second outlet passage 113 and the third outlet passage 114 are connected to the inlet passage 111 when the selector valve 100 is in the second state, that is, when the valve body 120 is moved to a second end in the sleeve 110 by the electromagnetic coil 140.

Next, the operation of the selector valve 100 configured as described above will be described.

When the operating state of the selector valve 100 is in the first state, the ATF flows through only the first passage 40 in the parallel passage section 60 as shown in FIG. 6(A).

When the operating state of the selector valve 100 is in the second state, the ATF flows through the first passage 40 and the second passage 50 in the parallel passage section 60 as shown in FIGS. 6(B) and 7. In the second state, the ATF is supplied to the first passage 40 via the second outlet passage 113, which is provided with the constriction 115. Thus, in the second state where the number of passages through which the ATF passes is increased compared to the first state, the pressure loss is increased at the outlet of the selector valve 100 to which the first passage 40 is connected. This suppresses the decrease in the pressure loss at the parallel passage section 60 caused by increasing the number of passages through which the ATF passes. More specifically, the levels of the pressure loss at the parallel passage section 60 before and after increasing the number of passages through which the ATF passes are equalized. Thus, before and after increasing the number of passages through which the ATF passes in the parallel passage section 60, the flow rate of ATF in the entire fluid supply apparatus is substantially uniform, and the amount of ATF supplied to the lubrication requiring parts 2a is substantially uniform.

As described above, the first embodiment has the following advantages.

(1) The selector valve 100 includes the pressure loss adjusting mechanism (constriction 115), which suppresses change in the pressure loss at the parallel passage section 60 associated with the change in the operating state of the selector valve 100. Thus, the pressure loss at the parallel passage section 60 is suppressed from being changed when the number of passages through which the ATF passes is changed in the parallel passage section 60. As a result, the flow rate of ATF in the parallel passage section 60 is also suppressed from being changed, thus also suppressing change in the flow rate of ATF in the entire fluid supply apparatus. Thus, although the number of passages through which the ATF passes in the parallel passage section 60 is changed, the flow rate of ATF in the fluid supply apparatus is suppressed from being changed.

(2) The pressure loss adjusting mechanism suppresses the decrease in the pressure loss in the parallel passage section 60 caused by increasing the number of passages through which the ATF passes in the parallel passage section 60 through operation of the selector valve 100. Thus, the change in the pressure loss after increasing the number of passages through which the ATF passes in the parallel passage section 60 is suppressed in a suitable manner. This suppresses, in a suitable manner, the flow rate in the fluid supply apparatus from being changed after increasing the number of passages through which the ATF passes.

(3) The parallel passage section 60 includes the first passage 40 and the second passage 50. Furthermore, the sleeve 110 of the selector valve 100 includes the inlet passage 111 connected to the main discharge passage 10, the first outlet passage 112 and the second outlet passage 113, which are connected to the first passage 40, and the third outlet passage 114, which is connected to the second passage 50. The constriction 115 is provided in the second outlet passage 113. Furthermore, the selector valve 100 includes the valve body 120, which switches the operating state of the selector valve 100. When the selector valve 100 is in the first state, the inlet passage 111 is connected to the first outlet passage 112, and in the second state, the second outlet passage 113 and the third outlet passage 114 are connected to the inlet passage 111.

Thus, when the selector valve 100 is in the first state, the ATF passes through only the first passage 40 in the parallel passage section 60. When the selector valve 100 is in the second state, the ATF passes through the first passage 40 and the second passage 50 in the parallel passage section 60.

In the second state, since the ATF is supplied to the first passage 40 via the second outlet passage 113, which is provided with the constriction 115, the pressure loss in the parallel passage section 60 is suppressed from being decreased due to the increase in the number of passages through which the ATF passes. Thus, the pressure loss in the parallel passage section 60 is suppressed from being changed in an appropriate manner after increasing the number of passages through which the ATF passes. This also suppresses, in an appropriate manner, the flow rate of ATF from being changed after increasing the number of passages through which the ATF passes.

(4) The fluid flowing through the main discharge passage 10 is the ATF, which functions as lubricant of the automatic transmission 2. The first passage 40 and the second passage 50, which configure the parallel passage section 60, are provided with the first heat exchanger 41 and the second heat exchanger 51, respectively, and supply the ATF that has been subjected to heat exchange to the lubrication requiring parts 2a of the automatic transmission 2. Thus, the number of passages through which the ATF passes in the parallel passage section 60 is changed in accordance with the operating state of the selector valve 100 so as to change the number of the heat exchangers through which the ATF passes in the parallel passage section 60. This permits the heat exchanger effectiveness of the ATF to be variable. According to the fluid supply apparatus of the first embodiment, although the number of passages through which the ATF passes in the parallel passage section 60 is changed, the flow rate of ATF in the entire fluid supply apparatus is suppressed from being changed. Therefore, in a case where the heat exchanger effectiveness of the ATF is changed by changing the number of heat exchangers through which the ATF passes in the parallel passage section 60 using the selector valve 100, the amount of ATF supplied to the lubrication requiring parts 2a of the automatic transmission 2 is suppressed from being changed.

A fluid supply apparatus 1B according to a second embodiment of the present invention will now be described with reference to FIGS. 8(A), 8(B), and 9.

The second embodiment has basically the same structure as the first embodiment except the structure of the passages of the selector valve. The fluid supply apparatus 1B according to the second embodiment will be described focusing on the differences between the first embodiment and the second embodiment.

As shown in FIG. 9, the fluid supply apparatus 1B has the main discharge passage 10, the main return passage 11, and a parallel passage section 60 which will be described below.

Figure 8A:
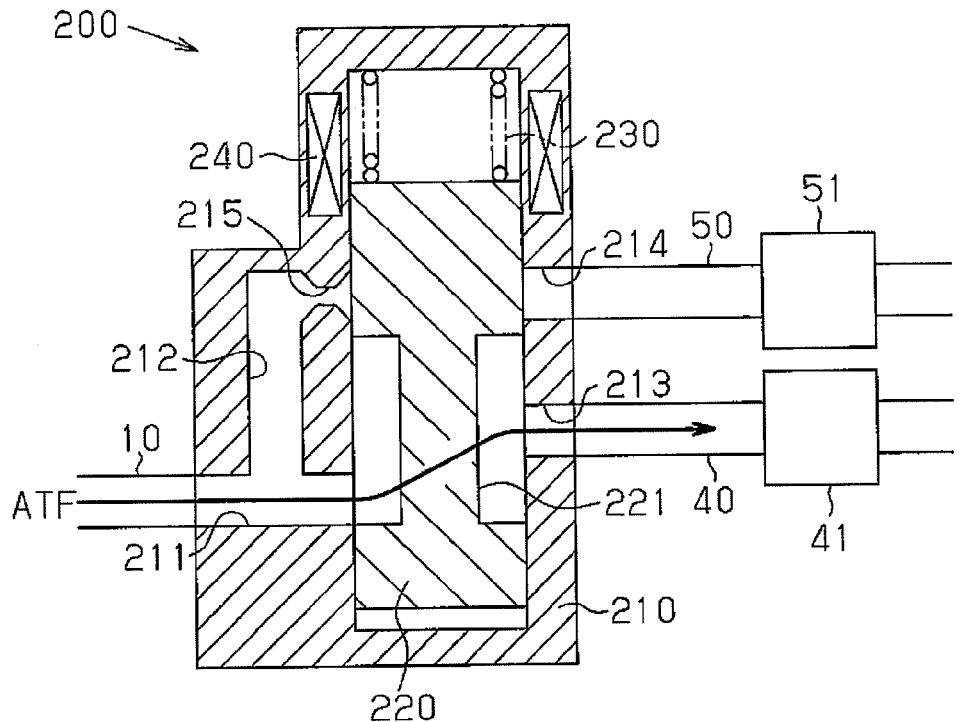
FIG. 8(A) is a cross-sectional view illustrating a selector valve according to a second embodiment in a first state.
Figure 8B:
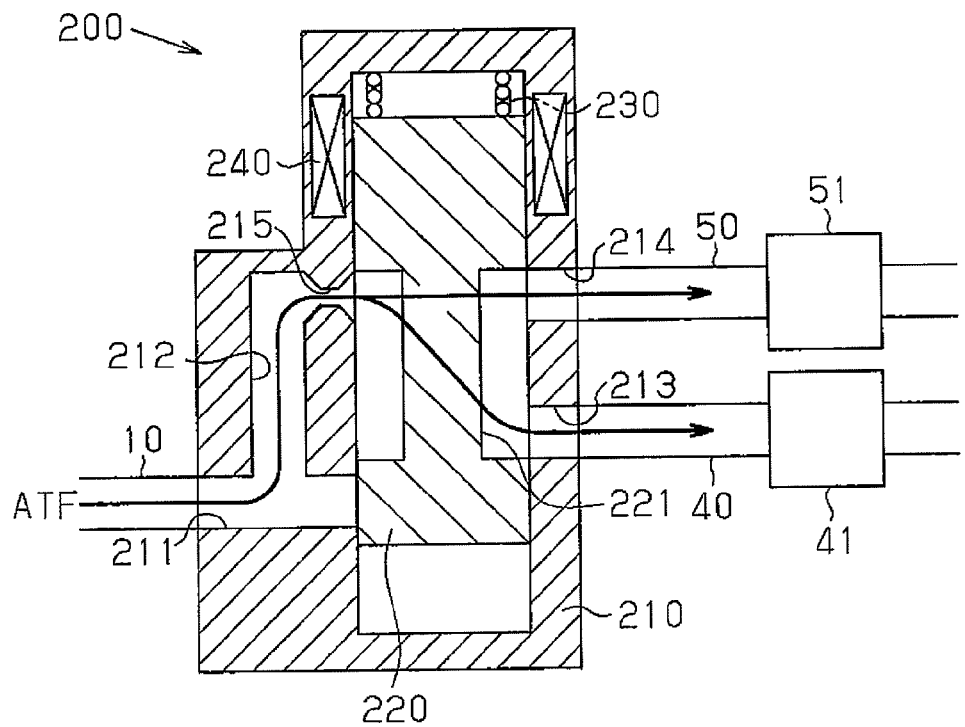
FIG. 8(B) is a cross-sectional view illustrating the selector valve according to the second embodiment in a second state.

FIGS. 8(A) and 8(B) show the cross-sectional structure of a selector valve 200 according to the second embodiment. FIG. 8(A) shows the cross-sectional structure of the selector valve 200 in a first state, and FIG. 8(B) shows the cross-sectional structure of the selector valve 200 in a second state.

As shown in FIGS. 8(A) and 8(B), the selector valve 200 includes a hollow sleeve 210, a rod-like valve body 220, a spring 230, and an electromagnetic coil 240. The valve body 220 moves in the sleeve 210 along the axial direction of the sleeve 210 to switch the operating state of the selector valve 200. The spring 230 urges the valve body 220 toward a first end in the sleeve 210. The electromagnetic coil 240 moves the valve body 220 in a direction opposite to the direction in which the spring 230 urges the valve body 220.

The sleeve 210 includes a first inlet passage 211 and a second inlet passage 212, which connect the main discharge passage 10 to the interior of the sleeve 210, a first outlet passage 213, which connects the first passage 40 to the interior of the sleeve 210, and a second outlet passage 214, which connects the second passage 50 to the interior of the sleeve 210.

A constriction 215 is provided in the second inlet passage 212. In the second embodiment, the constriction 215 configures the pressure loss adjusting mechanism. The constriction 215 increases the pressure loss of the second inlet passage 212 to compensate for the decrease in the pressure loss of the parallel passage section 60 caused by increasing the number of passages through which the ATF passes in the parallel passage section 60. The diameter of a bore forming the constriction 215 is of a size appropriate for compensating for the decrease in the pressure loss. In other words, the diameter of the bore forming the constriction 215 is set to a size that can equalize the levels of the pressure loss of the parallel passage section 60 before and after increasing the number of passages through which the ATF passes.

Furthermore, the valve body 220 includes a small diameter portion 221 for switching the connection state of the passages 211 to 214. As shown in FIG. 8(A), the small diameter portion 221 is formed such that the first inlet passage 211 is connected to the first outlet passage 213 when the selector valve 200 is in the first state, that is, when the valve body 220 is moved to the first end in the sleeve 210 by the force of the spring 230.

As shown in FIG. 8(B), the small diameter portion 221 is formed such that the first outlet passage 213 and the second outlet passage 214 are connected to the second inlet passage 212 when the selector valve 200 is in the second state, that is, when the valve body 220 is moved to a second end in the sleeve 210 by the electromagnetic coil 240.

Next, the operation of the selector valve 200 configured as described above will be described.

When the operating state of the selector valve 200 is in the first state, the ATF passes through only the first passage 40 in the parallel passage section 60 as shown in FIG. 8(A).

When the operating state of the selector valve 200 is in the second state, the ATF flows through the first passage 40 and the second passage 50 in the parallel passage section 60 as shown in FIGS. 8(B) and 9. In the second state, the ATF is supplied to the first passage 40 and the second passage 50 via the second inlet passage 212, which is provided with the constriction 215. Thus, in the second state where the number of passages through which the ATF passes is increased compared to the first state, the pressure loss is increased at the inlet of the selector valve 200, which communicates with the first passage 40 and the second passage 50. This suppresses the decrease in the pressure loss at the parallel passage section 60 due to increasing of the number of passages through which the ATF passes. More specifically, the levels of the pressure loss at the parallel passage section 60 before and after increasing the number of passages through which the ATF flows are equalized. Thus, before and after increasing the number of passages through which the ATF passes in the parallel passage section 60, the flow rate of ATF in the entire fluid supply apparatus is substantially uniform, and the amount of ATF supplied to the lubrication requiring parts 2a is also substantially uniform.

As described above, the selector valve 200 according to the second embodiment has the same advantages as the first embodiment.

A fluid supply apparatus 1C according to a third embodiment of the present invention will now be described with reference to FIGS. 10(A), 10(B), and 11.

The third embodiment has basically the same structure as the first embodiment except the structure of the passages of the selector valve. The fluid supply apparatus 1C according to the third embodiment will be described focusing on the differences between the first embodiment and the third embodiment.

As shown in FIG. 11, the fluid supply apparatus 1C has the main discharge passage 10, the main return passage 11, and a parallel passage section 60 which will be described below.

Figure 10A:
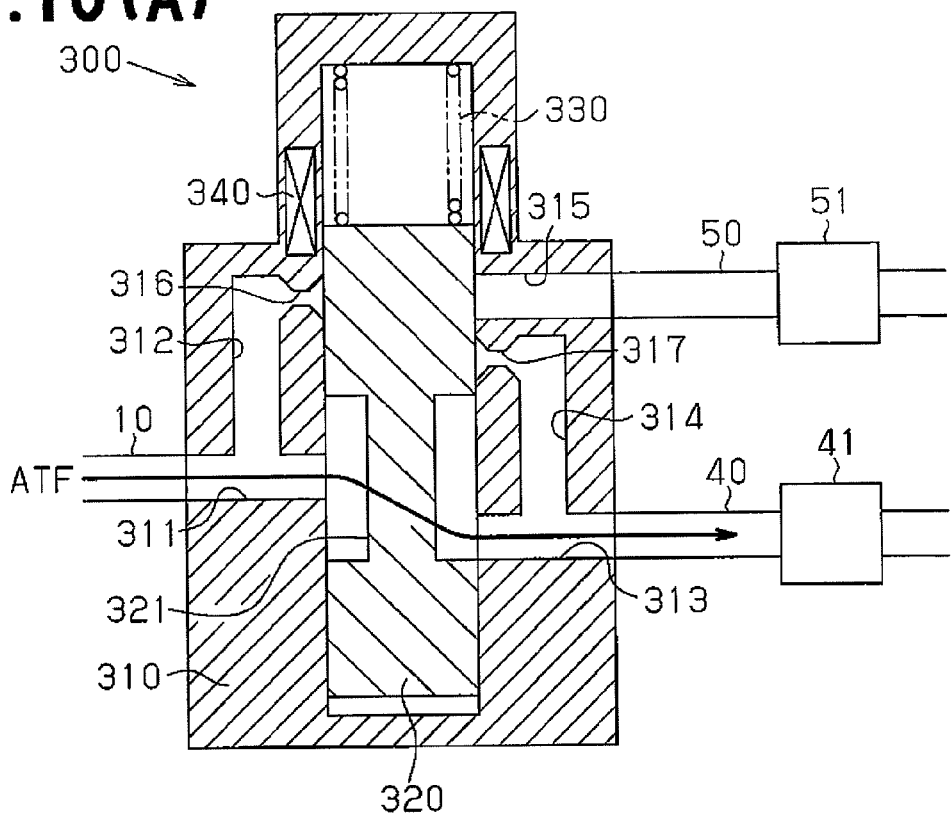
FIG. 10(A) is a cross-sectional view illustrating a selector valve according to a third embodiment in a first state.
Figure 10B:
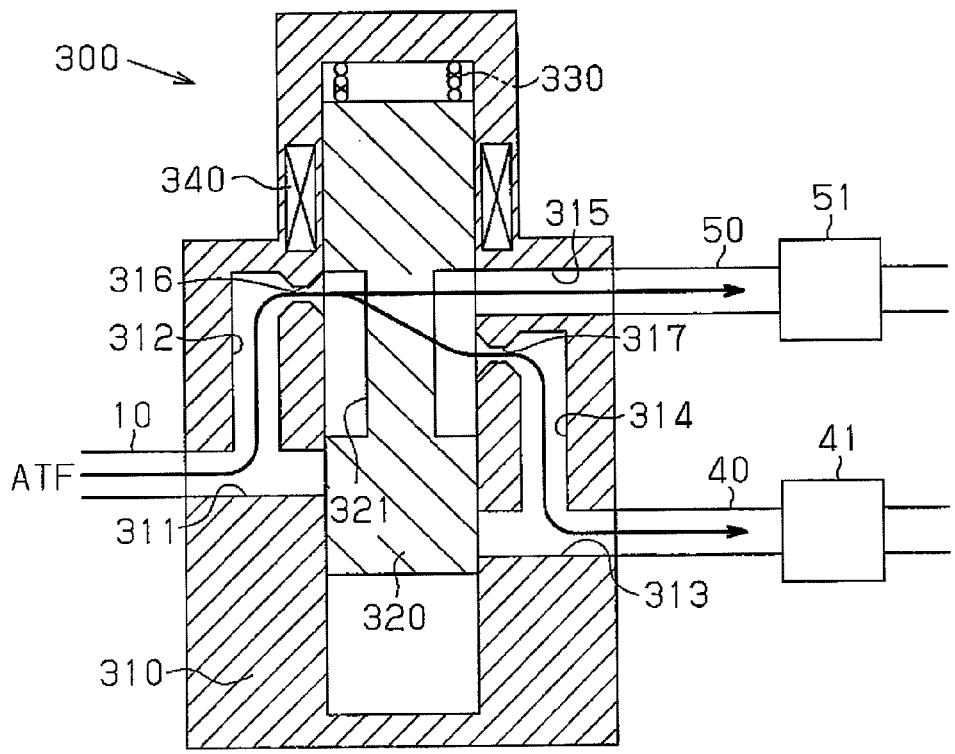
FIG. 10(B) is a cross-sectional view illustrating the selector valve according to the third embodiment in a second state.

FIGS. 10(A) and 10(B) show the cross-sectional structure of a selector valve 300 according to the third embodiment. FIG. 10(A) shows the cross-sectional structure of the selector valve 300 in a first state, and FIG. 10(B) shows the cross-sectional structure of the selector valve 300 in a second state.

As shown in FIGS. 10(A) and 10(B), the selector valve 300 includes a hollow sleeve 310, a rod-like valve body 320, a spring 330, and an electromagnetic coil 340. The valve body 320 moves in the sleeve 310 along the axial direction of the sleeve 310 to switch the operating state of the selector valve 300. The spring 330 urges the valve body 320 toward a first end in the sleeve 310. The electromagnetic coil 340 moves the valve body 320 in the sleeve 310 in a direction opposite to the direction in which the spring 330 urges the valve body 320.

The sleeve 310 includes a first inlet passage 311 and a second inlet passage 312, which connect the main discharge passage 10 to the interior of the sleeve 310, a first outlet passage 313 and a second outlet passage 314, which connect the first passage 40 to the interior of the sleeve 310, and a third outlet passage 315, which connects the second passage 50 to the interior of the sleeve 310.

Furthermore, the second inlet passage 312 is provided with a first constriction 316, and the second outlet passage 314 is provided with a second constriction 317. In the third embodiment, the first and second constrictions 316, 317 configure the pressure loss adjusting mechanism. The first constriction 316 increases the pressure loss of the second inlet passage 312 while the second constriction 317 increases the pressure loss of the second outlet passage 314 so as to compensate for the decrease in the pressure loss of the parallel passage section 60 caused by increasing the number of passages through which the ATF passes in the parallel passage section 60. The diameters of bores forming the first and second constrictions 316, 317 are set to sizes appropriate for compensating for the decrease in the pressure loss, in other words, to sizes that can equalize the levels of the pressure loss of the parallel passage section 60 before and after increasing the number of passages through which the ATF passes.

Furthermore, the valve body 320 includes a small diameter portion 321 for switching the connection state of the passages 311 to 315. As shown in FIG. 10(A), the small diameter portion 321 is formed such that the first inlet passage 311 is connected to the first outlet passage 313 when the selector valve 300 is in the first state, that is, when the valve body 320 is moved to the first end in the sleeve 310 by the force of the spring 330.

As shown in FIG. 10(B), the small diameter portion 321 is formed such that the second outlet passage 314 and the third outlet passage 315 are connected to the second inlet passage 312 when the selector valve 300 is in the second state, that is, when the valve body 320 is moved to a second end in the sleeve 310 by the electromagnetic coil 340.

Next, the operation of the selector valve 300 configured as described above will be described.

When the operating state of the selector valve 300 is in the first state, the ATF flows through only the first passage 40 in the parallel passage section 60 as shown in FIG. 10(A).

When the operating state of the selector valve 300 is in the second state, the ATF flows through the first passage 40 and the second passage 50 in the parallel passage section 60 as shown in FIGS. 10(B) and 11. In the second state, the ATF is supplied to the second passage 50 via the second inlet passage 312, which is provided with the first constriction 316, and to the first passage 40 via the second inlet passage 312 and the second outlet passage 314, which is provided with the second constriction 317. Thus, in the second state where the number of passages through which the ATF passes is increased compared to the first state, the pressure loss is increased at the inlet of the selector valve 300 that communicates with the first passage 40 and the second passage 50, and also at the outlet of the selector valve 300 that communicates with the first passage 40. This suppresses the decrease in the pressure loss at the parallel passage section 60 caused by increasing the number of passages through which the ATF passes. More specifically, the levels of the pressure loss at the parallel passage section 60 before and after increasing the number of passages through which the ATF passes are equalized. Thus, before and after increasing the number of passages through which the ATF passes in the parallel passage section 60, the flow rate of ATF in the entire fluid supply apparatus is substantially uniform, and the amount of ATF supplied to the lubrication requiring parts 2a is also substantially uniform.

As described above, the selector valve 300 according to the third embodiment has the same advantages as the first embodiment.

A fluid supply apparatus 1D according to a fourth embodiment of the present invention will now be described with reference to FIGS. 12(A), 12(B), and 13.

The fourth embodiment has basically the same structure as the first embodiment except the structure of the passages of the selector valve. The fluid supply apparatus 1D according to the fourth embodiment will be described focusing on the differences between the first embodiment and the fourth embodiment.

Figure 13:
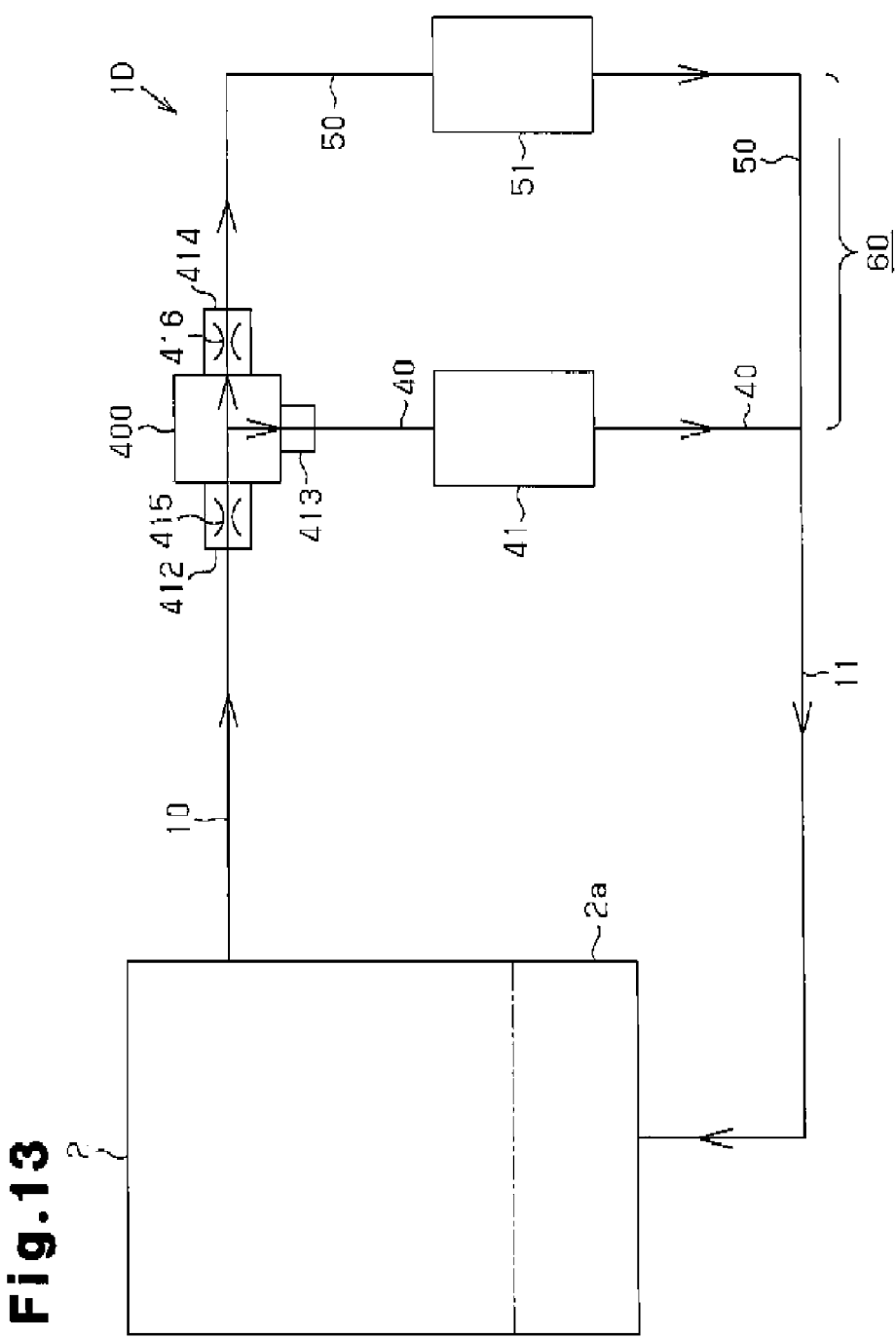
FIG. 13 is a schematic diagram illustrating the flow path of ATF when the operating state of the selector valve according to the fourth embodiment is in the second state.

As shown in FIG. 13, the fluid supply apparatus 1D has the main discharge passage 10, the main return passage 11, and a parallel passage section 60 which will be described below.

Figure 12A:
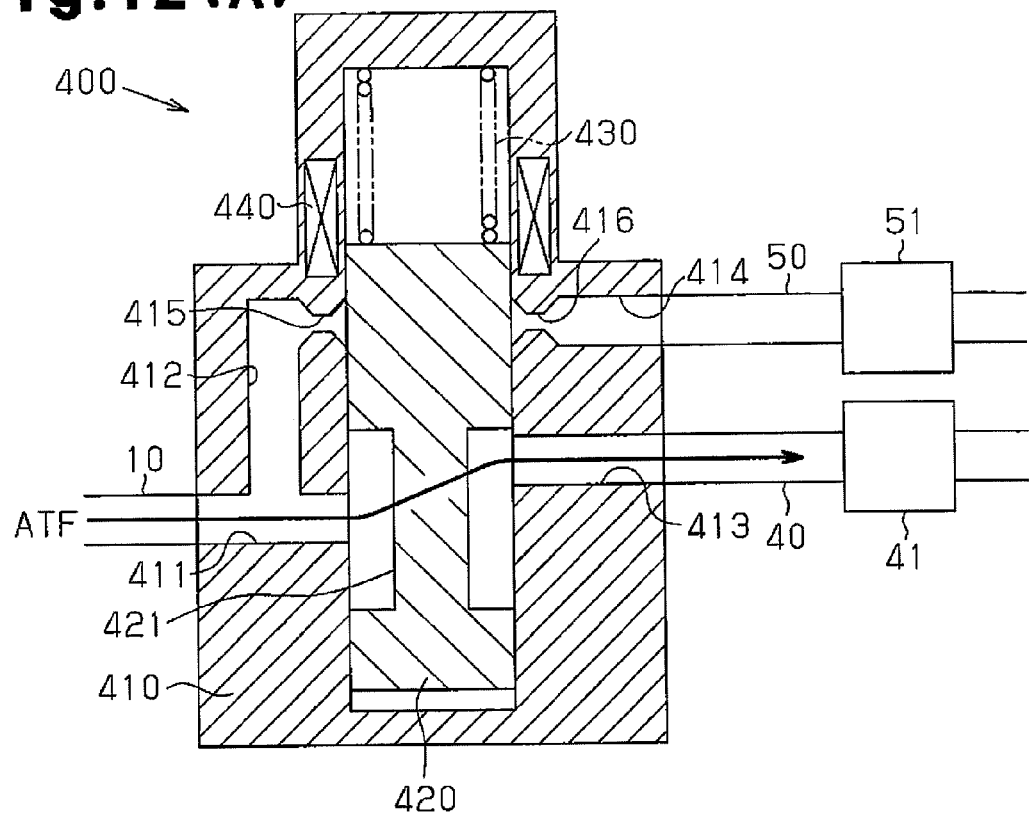
FIG. 12(A) is a cross-sectional view illustrating a selector valve according to a fourth embodiment in a first state.
Figure 12B:
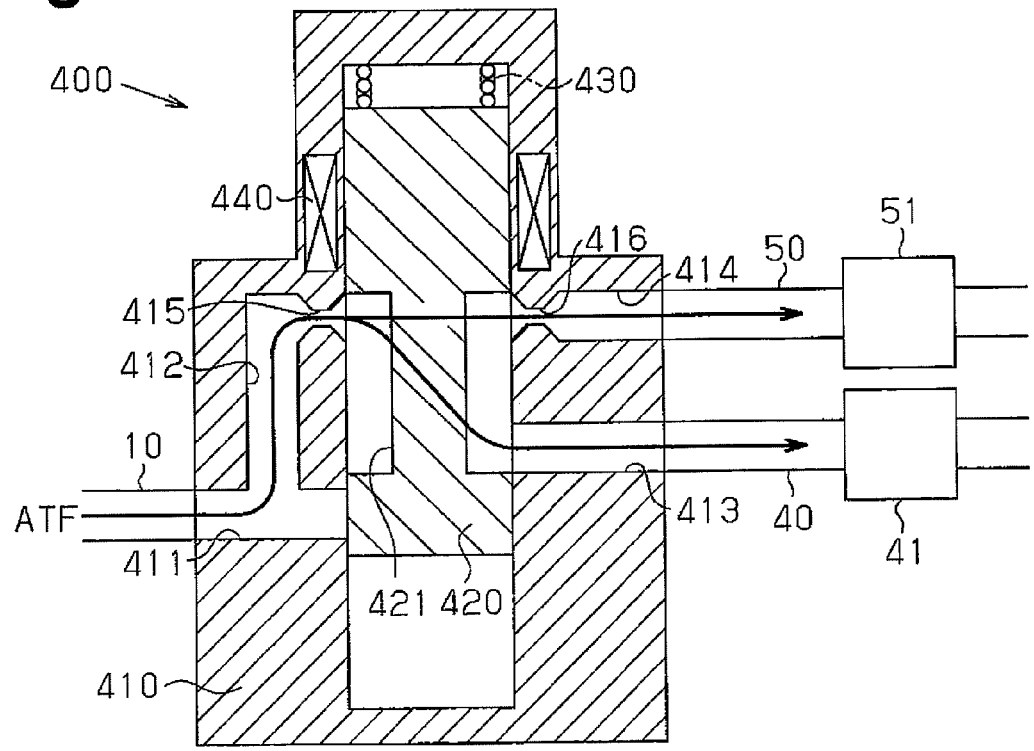
FIG. 12(B) is a cross-sectional view illustrating the selector valve according to the fourth embodiment in a second state.

FIGS. 12(A) and 12(B) show the cross-sectional structure of the selector valve 400 according to the fourth embodiment. FIG. 12(A) shows the cross-sectional structure of the selector valve 400 in a first state, and FIG. 12(B) shows the cross-sectional structure of the selector valve 400 in a second state.

As shown in FIGS. 12(A) and 12(B), the selector valve 400 includes a hollow sleeve 410, a rod-like valve body 420, a spring 430, and an electromagnetic coil 440. The valve body 420 moves in the sleeve 410 along the axial direction of the sleeve 410 to switch the operating state of the selector valve 400. The spring 430 urges the valve body 420 toward a first end in the sleeve 410. The electromagnetic coil 440 moves the valve body 420 in the sleeve 410 in a direction opposite to the direction in which the spring 130 urges the valve body 420.

The sleeve 410 includes a first inlet passage 411 and a second inlet passage 412, which connect the main discharge passage 10 to the interior of the sleeve 410, a first outlet passage 413, which connects the first passage 40 to the interior of the sleeve 410, and a second outlet passage 414, which connects the second passage 50 to the interior of the sleeve 410.

Furthermore, the second inlet passage 412 is provided with a first constriction 415, and the second outlet passage 414 is provided with a second constriction 416. In the fourth embodiment, the first and second constrictions 415, 416 configure the pressure loss adjusting mechanism. The first constriction 415 increases the pressure loss of the second inlet passage 412 while the second constriction 416 increases the pressure loss of the second outlet passage 414 so as to compensate for the decrease in the pressure loss of the parallel passage section 60 caused by increasing the number of passages through which the ATF passes in the parallel passage section 60. The diameter of bores forming the first and second constrictions 415, 416 is set to a size appropriate for compensating for the decrease in the pressure loss, in other words, to a size that can equalize the levels of the pressure loss of the parallel passage section 60 before and after increasing the number of passages through which the ATF passes.

Furthermore, the valve body 420 includes a mall diameter portion 421 for switching the connection state of the passages 411 to 414. As shown in FIG. 12(A), the small diameter portion 421 is formed such that the first inlet passage 411 is connected to the first outlet passage 413 when the selector valve 400 is in the first state, that is, when the valve body 420 is moved to the first end in the sleeve 410 by the force of the spring 430.

Also, as shown in FIG. 12(B), the small diameter portion 421 is formed such that the first outlet passage 413 and the second outlet passage 414 are connected to the second inlet passage 412 when the selector valve 400 is in the second state, that is, when the valve body 420 is moved to a second end in the sleeve 410 by the electromagnetic coil 440.

Next, the operation of the selector valve 400 configured as described above will be described.

When the operating state of the selector valve 400 is in the first state, the ATF flows through only the first passage 40 in the parallel passage section 60 as shown in FIG. 12(A).

When the operating state of the selector valve 400 is in the second state, the ATF flows through the first passage 40 and the second passage 50 in the parallel passage section 60 as shown in FIGS. 12(B) and 13. In the second state, the ATF is supplied to the first passage 40 via the second inlet passage 412, which is provided with the first constriction 415, and the ATF is supplied to the second passage 50 via the second inlet passage 412 and the second outlet passage 414, which is provided with the second constriction 416. Thus, in the second state where the number of passages through which the ATF passes is increased compared to the first state, the pressure loss is increased at the inlet of the selector valve 400 that communicates with the first passage 40 and the second passage 50, and at the outlet of the selector valve 400 that communicates with the second passage 50. This suppresses the decrease in the pressure loss at the parallel passage section 60 caused by increasing the number of passages through which the ATF passes. More specifically, the levels of the pressure loss at the parallel passage section 60 before and after increasing the number of passages through which the ATF passes are equalized. Thus, before and after increasing the number of passages through which the ATF passes in the parallel passage section 60, the flow rate of ATF in the entire fluid supply apparatus is substantially uniform, and the amount of ATF supplied to the lubrication requiring parts 2a is also substantially uniform.

As described above, the selector valve 400 according to the fourth embodiment has the same advantages as the first embodiment.

A fluid supply apparatus 1E according to a fifth embodiment of the present invention will now be described with reference to FIGS. 14(A), 14(B), and 15.

The fifth embodiment has basically the same structure as the first embodiment except the structure of the passages of the selector valve. The fluid supply apparatus 1E according to the fifth embodiment will be described focusing on the differences between the first embodiment and the fifth embodiment.

Figure 15:
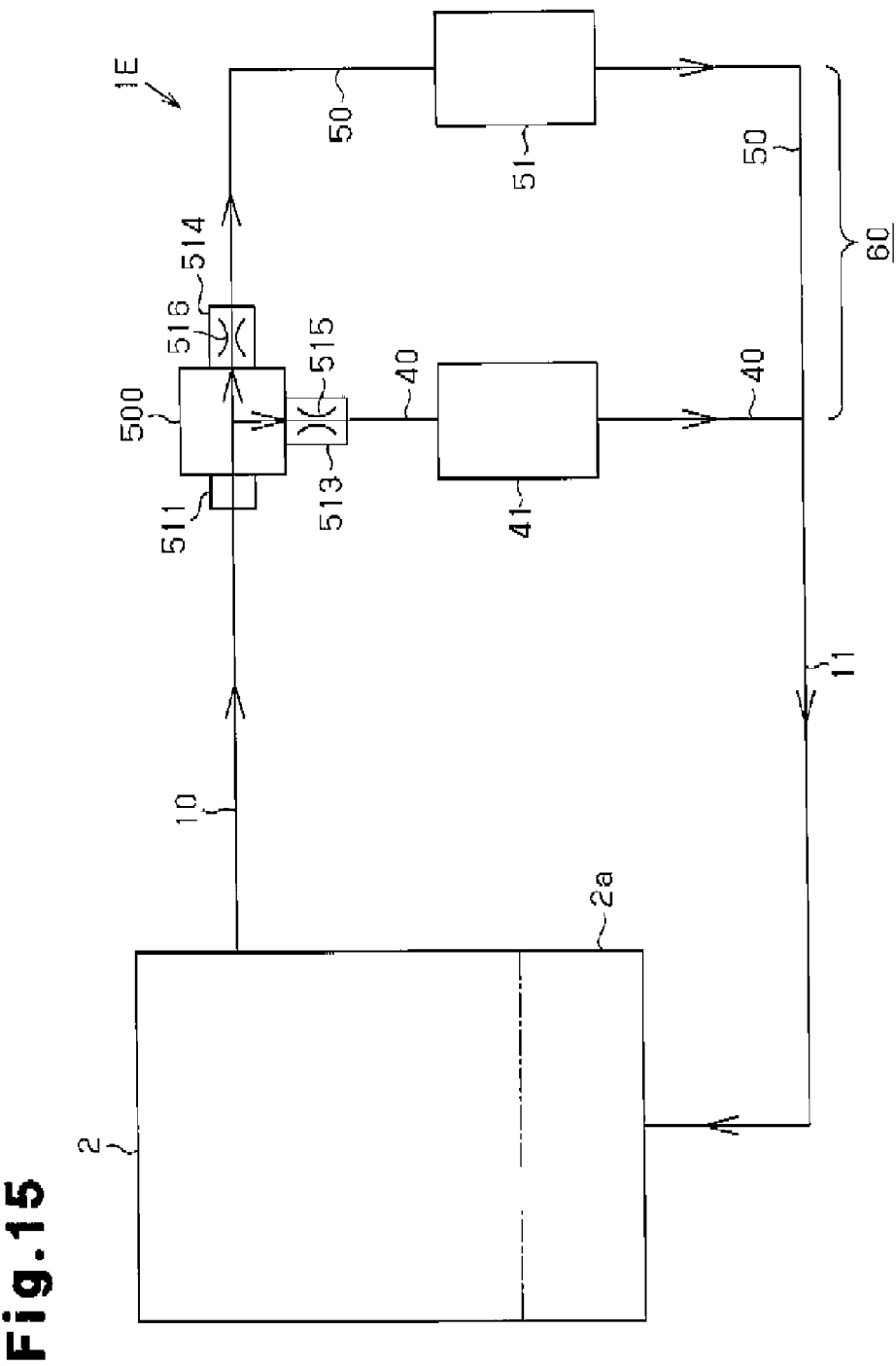
FIG. 15 is a schematic diagram illustrating the flow path of ATF when the operating state of the selector valve according to the fifth embodiment is in the second state.

As shown in FIG. 15, the fluid supply apparatus 1E has the main discharge passage 10, the main return passage 11, and a parallel passage section 60 which will be described below.

Figure 14A:
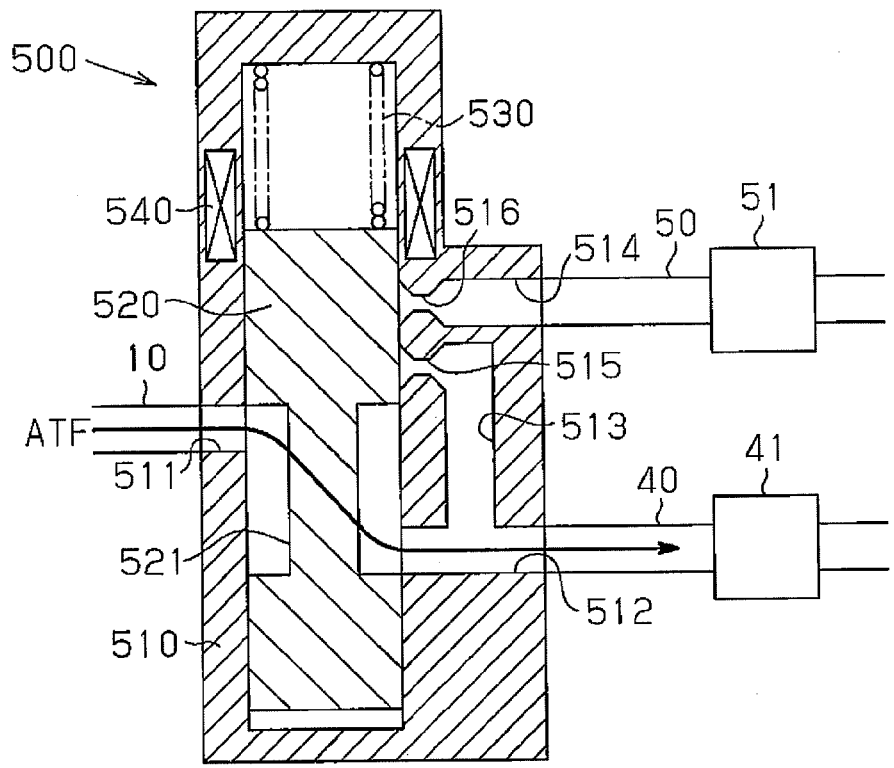
FIG. 14(A) is a cross-sectional view illustrating a selector valve according to a fifth embodiment in a first state.
Figure 14B:
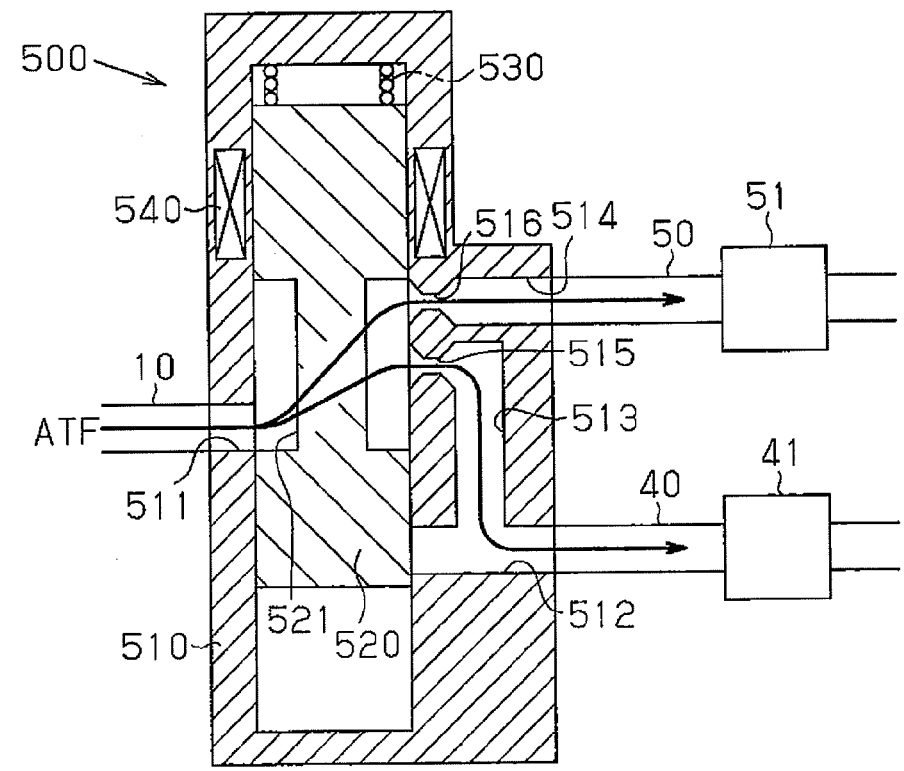
FIG. 14(B) is a cross-sectional view illustrating the selector valve according to the fifth embodiment in a second state.

FIGS. 14(A) and 14(B) show the cross-sectional structure of the selector valve 500 according to the fifth embodiment. FIG. 14(A) shows the cross-sectional structure of the selector valve 500 in a first state, and FIG. 14(B) shows the cross-sectional structure of the selector valve 500 in a second state.

As shown in FIGS. 14(A) and 14(B), the selector valve 500 includes a hollow sleeve 510, a rod-like valve body 520, a spring 530, and an electromagnetic coil 540. The valve body 520 moves in the sleeve 510 along the axial direction of the sleeve 510 to switch the operating state of the selector valve 500. The spring 530 urges the valve body 520 toward a first end in the sleeve 510. The electromagnetic coil 540 moves the valve body 520 in the sleeve 510 in a direction opposite to the direction in which the spring 530 urges the valve body 520.

The sleeve 510 includes an inlet passage 511, which connects the main discharge passage 10 to the interior of the sleeve 510, a first outlet passage 512 and a second outlet passage 513, which connect the first passage 40 to the interior of the sleeve 510, and a third outlet passage 514, which connects the second passage 50 to the interior of the sleeve 510.

Furthermore, the second outlet passage 513 is provided with a first constriction 515, and the third outlet passage 514 is provided with a second constriction 516. In the fifth embodiment, the first and second constrictions 515, 516 configure the pressure loss adjusting mechanism. The first constriction 515 increases the pressure loss of the second outlet passage 513 while the second constriction 516 increases the pressure loss of the third outlet passage 514. This compensates for the decrease in the pressure loss at the parallel passage section 60 caused by increasing the number of passages through which the ATF passes in the parallel passage section 60. The diameter of bores forming the first and second constrictions 515, 516 is set to a size appropriate for compensating for the decrease in the pressure loss, in other words, to a size that can equalize the levels of the pressure loss of the parallel passage section 60 before and after increasing the number of passages through which the ATF passes.

Furthermore, the valve body 520 includes a small diameter portion 521 for switching the connection state of the passages 511 to 514. As shown in FIG. 14(A), the small diameter portion 521 is formed such that the inlet passage 511 is connected to the first outlet passage 512 when the selector valve 500 is in the first state, that is, when the valve body 520 is moved to the first end in the sleeve 510 by the force of the spring 530.

Also, as shown in FIG. 14(B), the small diameter portion 521 is formed such that the second outlet passage 513 and the third outlet passage 514 are connected to the inlet passage 511 when the selector valve 500 is in the second state, that is, when the valve body 520 is moved to a second end in the sleeve 510 by the electromagnetic coil 540.

Next, the operation of the selector valve 500 configured as described above will be described.

When the operating state of the selector valve 500 is in the first state, the ATF passes through only the first passage 40 in the parallel passage section 60 as shown in FIG. 14(A).

When the operating state of the selector valve 500 is in the second state, the ATF passes through the first passage 40 and the second passage 50 in the parallel passage section 60 as shown in FIGS. 14(B) and 15. In the second state, the ATF is supplied to the first passage 40 via the second outlet passage 513, which is provided with the first constriction 515, and the ATF is supplied to the second passage 50 via the third outlet passage 514, which is provided with the second constriction 516. Thus, in the second state where the number of passages through which the ATF passes is increased compared to the first state, the pressure loss is increased at the outlet of the selector valve 500 that communicates with the first passage 40, and at the outlet of the selector valve 500 that communicates with the second passage 50. This suppresses the decrease in the pressure loss at the parallel passage section 60 caused by increasing the number of passages through which the ATF passes. More specifically, the levels of the pressure loss at the parallel passage section 60 before and after increasing the number of passages through which the ATF passes are equalized. Thus, before and after increasing the number of passages through which the ATF passes in the parallel passage section 60, the flow rate of ATF in the entire fluid supply apparatus is substantially uniform, and the amount of ATF supplied to the lubrication requiring parts 2a is also substantially uniform.

As described above, the selector valve 500 according to the fifth embodiment has the same advantages as the first embodiment.

The embodiments may be modified as follows.

In each of the embodiments, the passages of the sleeve and the small diameter portion of the valve body may be provided such that the selector valve is in the second state when de-energized and is in the first state when energized.

The structure of the selector valve in each of the embodiments is an example of the present invention. The selector valve may be configured in any way as long as the ATF is supplied to only the first passage 40 when the selector valve is in the first state, and the ATF is supplied to the first passage 40 and the second passage 50 when the selector valve is in the second state, and the pressure loss at the parallel passage section 60 is the same as that in the first state.

The diameter of the bore of the constriction may be set such that the difference between the pressure loss at the parallel passage section 60 before and after increasing the number of passages through which the ATF passes is at least small. This suppresses the change in the pressure loss at the parallel passage section 60 associated with the change in the operating state of the selector valve. In other words, the pressure loss at the parallel passage section 60 is suppressed from being changed when the number of passages through which the ATF passes in the parallel passage section 60 is changed. Since the pressure loss at the parallel passage section 60 is suppressed from being changed, the flow rate of ATF at the parallel passage section 60 is also suppressed from being changed, and thus the flow rate of ATF in the entire fluid supplying apparatus is also suppressed. Thus, the flow rate of ATF in the fluid supply apparatus is suppressed from being changed when the number of passages through which the ATF passes in the parallel passage section 60 is changed.

The parallel passage section 60 includes the first passage 40 and the second passage 50, but may include three or more passages. In this case also, the present invention may be applied based on the same principle as the above embodiments. That is, in a case where the operating state of the selector valve is changed to change the number of passages through which the ATF passes in the parallel passage section 60, the selector valve is configured so as to suppress the change in the pressure loss at the parallel passage section 60 caused by changing the number of passages through which the ATF passes.

The pressure loss adjusting mechanism, which suppresses the change in the pressure loss at the parallel passage section 60 associated with the change in the operating state of the selector valve, is provided in the selector valve. However such a pressure loss adjusting mechanism may be provided in other part of the fluid supply apparatus.

The automatic transmission 2 is a planetary gear automatic transmission, but may be other transmissions. The automatic transmission may be, for example, a continuously variable transmission (CVT) configured by pulleys and a belt or a manual transmission.

In each of the embodiments, the fluid supply apparatus of the present invention is applied to the fluid supply apparatus for performing heat exchange with the ATF of the automatic transmission, but the application of the fluid supply apparatus of the present invention is not limited to this. The present invention may be applied to any fluid supply apparatus in the same manner as long as the fluid supply apparatus includes a main passage through which fluid flows, a parallel passage section in which passages are connected in parallel to the main passage, and a selector valve, which changes the number of passages through which fluid passes in the parallel passage section.

The invention claimed is:

1. A fluid supply apparatus comprising:
a main passage through which fluid flows; and
a parallel passage section, which includes first and second passages connectable in parallel to the main passage, the parallel passage section including a selector valve, which is located between i) the main passage and ii) the first and second passages;
wherein the selector valve includes:
a first inlet passage and a second inlet passage, which communicate with the main passage;
a first outlet passage, which communicates with the first passage;
a second outlet passage, which communicates with the second passage;
a constriction provided in the second inlet passage; and
a valve body, which selectively switches an operating state of the selector valve between a first state and a second state,
wherein, when the operating state of the selector valve is in the first state, the first inlet passage communicates with the first outlet passage so that the fluid flows from the main passage to the first passage through the first inlet passage and the first outlet passage and wherein, when the operating state of the selector valve is in the second state, the second inlet passage communicates with both the first and second outlet passages so that the fluid flows from the main passage to both the first and second passages through the second inlet passage and the first and second outlet passages,
wherein the constriction suppresses decrease in a pressure loss at the parallel passage section associated with change in the operating state of the selector valve from the first state to the second state.

2. The fluid supply apparatus according to claim 1,
wherein the fluid is lubricant of an automatic transmission, the first and second passages of the parallel passage section each being provided with a heat exchanger, and the fluid supply apparatus is adapted to be connected to the automatic transmission so that the lubricant that has been subjected to heat exchange with at least one of the heat exchangers is supplied to parts requiring lubrication in the automatic transmission.

* * * * *